(12) United States Patent
Hanrieder

(10) Patent No.: US 11,635,755 B2
(45) Date of Patent: Apr. 25, 2023

(54) INTEGRATED AGRICULTURAL PRODUCTION SYSTEM AND METHOD

(71) Applicant: AGCO INTERNATIONAL GmbH, Neuhausen (CH)

(72) Inventor: Florian Hanrieder, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 165 days.

(21) Appl. No.: 16/914,633

(22) Filed: Jun. 29, 2020

(65) Prior Publication Data
US 2020/0409353 A1    Dec. 31, 2020

Related U.S. Application Data

(60) Provisional application No. 62/867,833, filed on Jun. 27, 2019.

(51) Int. Cl.
*G05D 1/00* (2006.01)
*G06F 16/9035* (2019.01)
(Continued)

(52) U.S. Cl.
CPC ......... *G05D 1/0022* (2013.01); *G05D 1/0016* (2013.01); *G06F 16/9035* (2019.01);
(Continued)

(58) Field of Classification Search
CPC ............... G05D 1/0022; G05D 1/0016; G05D 2201/0201; G06F 16/9035; H04W 12/08; H04W 56/001; H04L 67/1002
See application file for complete search history.

(56) References Cited

U.S. PATENT DOCUMENTS

| | | | | |
|---|---|---|---|---|
| 7,797,367 B1 * | 9/2010 | Gelvin | ................... | H04L 67/12 709/200 |
| 7,933,668 B2 * | 4/2011 | Braun | .................. | G05B 19/042 700/83 |

(Continued)

FOREIGN PATENT DOCUMENTS

EP    3 469 867 A2    4/2019

OTHER PUBLICATIONS

European Patent Office, Search Report for related European Application No. EP 20 18 0950, dated Aug. 17, 2020.

*Primary Examiner* — Todd L Barker

(57) ABSTRACT

A host system maintains a plurality of user accounts each including offboard electronic device information and agricultural machine information specific to a user. The host system receives requests for user access, determines whether the source of the request is an offboard electronic device or an onboard computing system of an agricultural machine, determines whether the user has access rights to the device or system, and identifies any apps authorized for use by the user and the device or system. The host system synchronizes application data and settings between the device or system and the user's account so that when the user runs related apps from any device or machine the app data and the settings will be reflected. When a user purchases an application for a device or machine the same or related applications automatically become available on other devices or systems that are managed by the host system.

17 Claims, 9 Drawing Sheets

(51) Int. Cl.
*H04W 12/08* (2021.01)
*H04W 56/00* (2009.01)
*H04L 67/1001* (2022.01)

(52) U.S. Cl.
CPC .... *H04W 12/08* (2013.01); *G05D 2201/0201* (2013.01); *H04L 67/1001* (2022.05); *H04W 56/001* (2013.01)

(56) References Cited

U.S. PATENT DOCUMENTS

| | | | |
|---|---|---|---|
| 11,159,640 B2* | 10/2021 | Shamasundar | G08G 5/0021 |
| 2009/0037492 A1 | 2/2009 | Baitalmal et al. | |
| 2014/0082117 A1 | 3/2014 | Unhale et al. | |
| 2016/0242024 A1* | 8/2016 | Karren | G06F 21/88 |
| 2017/0090741 A1 | 3/2017 | Tentinger et al. | |
| 2017/0261978 A1* | 9/2017 | Gresch | G06Q 30/0645 |
| 2018/0212946 A1* | 7/2018 | Nix | H04W 12/40 |
| 2019/0174207 A1* | 6/2019 | Celia | H04Q 9/00 |
| 2020/0118222 A1* | 4/2020 | Bidram | B65G 1/1375 |
| 2020/0322449 A1* | 10/2020 | Shamasundar | G06F 3/147 |
| 2021/0243951 A1* | 8/2021 | Vandike | A01D 41/127 |

* cited by examiner

INTEGRATED AGRICULTURAL PRODUCTION SYSTEM AND METHOD

RELATED APPLICATIONS

The present application claims priority under 35 U.S.C. § 119 to U.S. Provisional Application Ser. No. 62/867,833, filed Jun. 27, 2019. The full disclosure, in its entirety, of U.S. Provisional Application Ser. No. 62/867,833 is hereby incorporated by reference.

FIELD

Embodiments of the present invention relate to agricultural production systems. More particularly, embodiments of the present invention relate to systems and methods for integrated access and control of hardware and software assets and services through a host system accessible via various onboard computing systems of agricultural machines and offboard electronic devices.

BACKGROUND

Modern technology has had a large impact on the agricultural industry. Agricultural machines such tractors, combine harvesters and sprayers are no longer operated entirely manually, but have onboard computing systems integrated into the machines that assist the machine operator with some functions and automate other machine functions. These onboard computing systems typically include multiple computing devices embedded in the machine at various locations, sensors for gathering machine and agronomic data and actuators for controlling certain mechanical systems of the machine. Onboard computing systems include a human-machine interface that allow the operator to interact with and control the computing system.

Computer software has been developed to assist producers in nearly every aspect of agricultural production. Farm management software helps producers use data collected by agricultural machines on the ground as well as other sources (e.g., drones and satellites) to understand their operations, identify and address problems and plan their operations. Farm management software includes crop management software, planning and budgeting software, purchasing and inventory, production management and logistics, production tracking and inventory, harvest tracking and reporting.

The above section provides background information related to the present disclosure which is not necessarily prior art.

SUMMARY

A computing system according to a first embodiment comprises one or more computing devices implementing a host system for maintaining a plurality of user accounts, each of the user accounts including offboard electronic device information and agricultural machine information specific to a user. The offboard electronic device information includes device access rights, offboard application access rights and offboard application data for at least one offboard electronic device, and the agricultural machine information includes agricultural machine access rights, user onboard application access rights, machine onboard application access rights and machine onboard application data for at least one agricultural machine.

The host system is configured to receive a request for user access, the request for user access including user identification information and source identification information, use the user identification information to identify a user account from the plurality of user accounts corresponding to the request for user access, use the source identification information to determine whether the source of the request for user access is an offboard electronic device or an onboard computing system of an agricultural machine, and use the source identification information and information from the user account corresponding to the request for user access to determine whether the user has access rights to the offboard electronic device or the agricultural machine.

If the source of the request for user access is an offboard electronic device and the user has access rights to the offboard electronic device, the host system identifies offboard applications that are authorized for the offboard electronic device according to the user account, communicates authorized offboard application information to the offboard electronic device, the authorized offboard application information for enabling operation of authorized offboard applications on the offboard electronic device, and synchronizes offboard application data between the offboard electronic device and the host system.

If the source of the request for user access is an onboard computing system and the user has access rights to the agricultural machine, the host system identifies onboard applications that are authorized for the user and that are authorized for the agricultural machine according to the user account, communicates authorized onboard application information to the onboard computing system, the authorized onboard application information for enabling onboard applications, the onboard applications running on the onboard computing system and enabling functionality of mechanical systems of the agricultural machine. The host system synchronizes onboard application data between the onboard computing system of the agricultural machine and the host system.

In some embodiments, the host system receives setting information from the user and stores the setting information in the user profile, the setting information applying to a both offboard electronic devices and onboard computing systems. The setting information may include human-machine interface presentation preferences that are applied to both offboard electronic device human-machine interfaces and agricultural machine human-machine interfaces.

In some embodiments, the agricultural machine information includes at least one of tractor information, combine harvester information and applicator information. In some embodiments, the agricultural machine information includes primary machine information and secondary machine information, wherein the secondary machine information relates to an implement attached to the primary machine.

In some embodiments, the offboard application access rights and the onboard application access rights include access rights to third-party applications that require interaction with a third-party host site, communicating authorized application information to the offboard electronic device includes enabling the portable electronic device to access the third-party host site, and communicating authorized onboard application information to the onboard computing system includes enabling the computing system to access the third-party host site.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
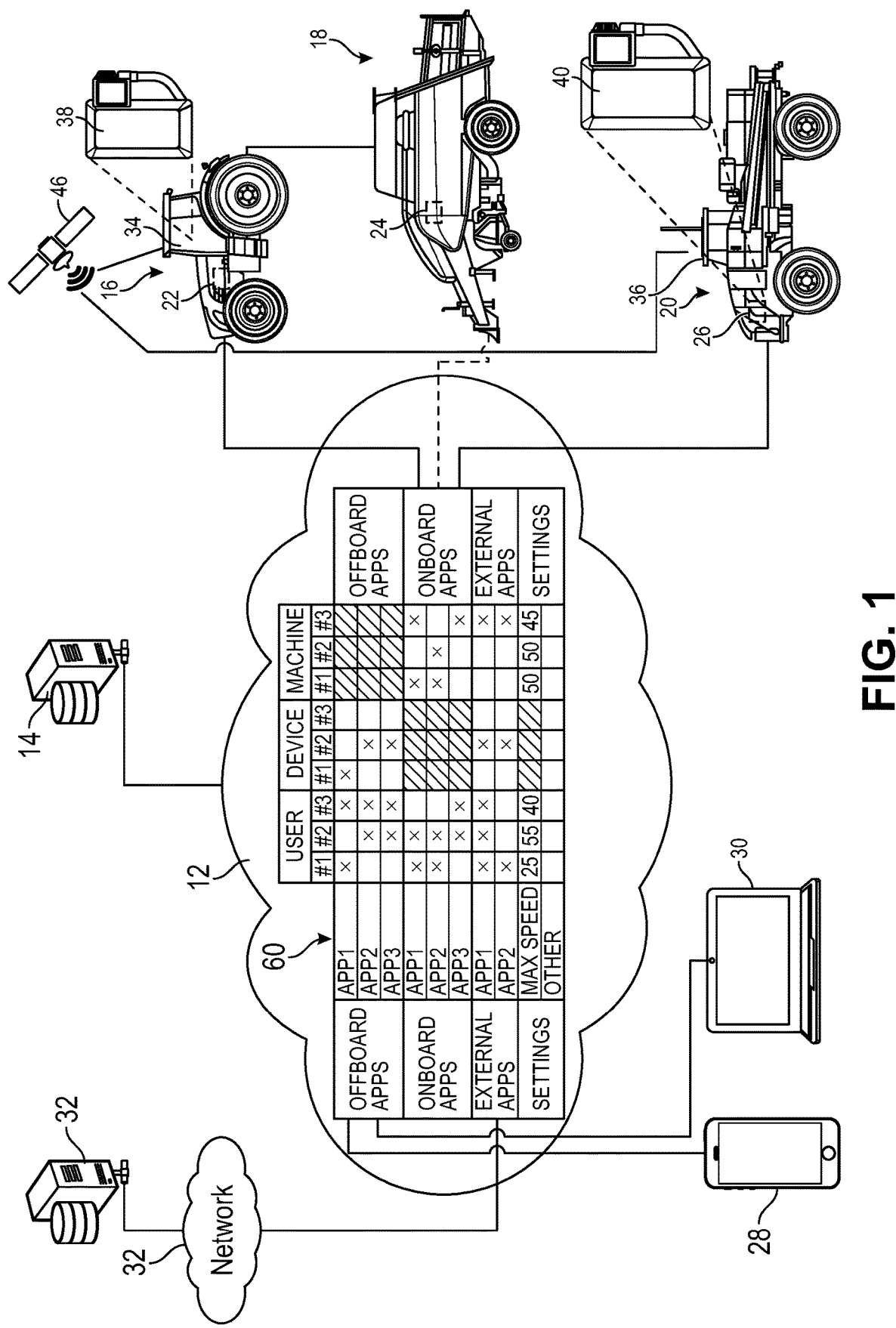
FIG. 1 illustrates certain components of an integrated agricultural production system.

The drawing figures do not limit the present invention to the specific embodiments disclosed and described herein. The drawings are not necessarily to scale, emphasis instead being placed upon clearly illustrating the principles of the invention.

DESCRIPTION

The following description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein. Computer software applications may be referred to herein as "software applications", "computer applications", "applications", "apps" with the understanding that all of these terms may be used interchangeably and refer to the same thing.

Turning now to the drawings and initially FIG. 1, an integrated agricultural production system 10 includes a host system 12 implemented by one or more computing devices 14, a plurality of agricultural machines 16, 18, 20 with onboard computing systems 22, 24, 26 configured to access the host system 12, a plurality of offboard electronic devices 28, 30 configured to access the host system 12, and one or more third-party systems 32 configured to provide services via the plurality of agricultural machines 16, 18, 20, via the plurality of offboard electronic devices 28, 30, or both. The host system 12 manages access to the one or more third-party systems 32 by the onboard computing systems of the agricultural machines and by the offboard electronic devices. Some of the agricultural machines like the tractor 16 and the sprayer 20 include operator cabins 34, 36 and user interfaces 38, 40 that form part of or work in conjunction with the onboard computing systems 22, 26. Other agricultural machines like the baler 18 are intended to be coupled with, pulled by and/or otherwise used in combination with another agricultural machine.

Figure 2:
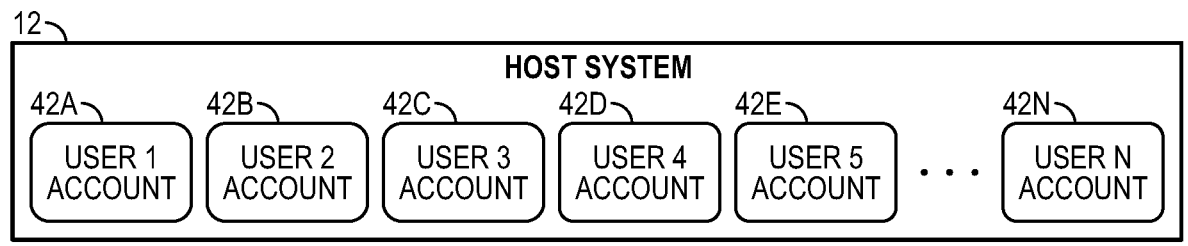
FIG. 2 is a diagram illustrating certain portions of a host system, including a plurality of user accounts, that is part of the integrated agricultural production system of FIG. 1.
Figure 3:
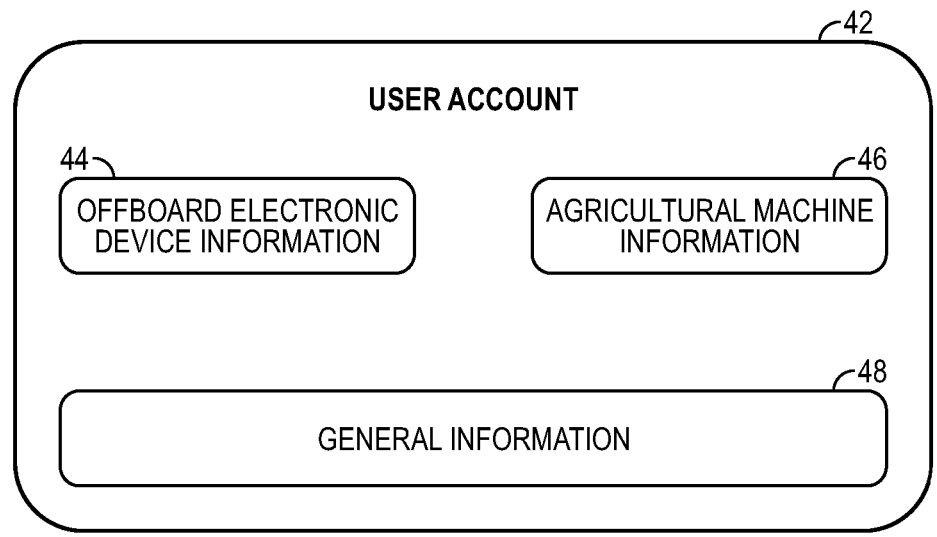
FIG. 3 is a diagram illustrating certain portions of the user accounts of FIG. 2.

The host system 12 is implemented by the one or more computing devices 14 such as web servers that are accessible via the internet by the offboard electronic devices 28, 30 and the onboard computing systems 22, 24, 26 of the agricultural machines 16, 18, 20. With particular reference to FIGS. 2 and 3, the host system 12 maintains a plurality of user accounts 42a-n, each of the user accounts including offboard electronic device information 44, agricultural machine information 46 and general information 48. The offboard electronic device information 44 includes, without limitation, device access rights, offboard application access rights and offboard application data for at least one offboard electronic device. The agricultural machine information 46 includes, without limitation, agricultural machine access rights, user onboard application access rights, machine onboard application access rights and machine onboard application data for at least one agricultural machine.

The agricultural machine information 46 includes information that is unique to particular machines as well as information that pertains to two or more machines. User access rights and authorized onboard apps are examples of information that is unique to a particular machine. Operator cabin preferences such as seat and mirror placement, maximum speed settings and geographic limitations are examples of information that may pertain to two or more agricultural machines.

The general information 48 applies to multiple or all offboard electronic devices and multiple or all agricultural machines. The look and feel and layout of a graphical user interface is an example of general information that applies to all offboard electronic devices and all agricultural machines that have user interfaces. A user may make a change to user interface preferences on one offboard electronic device or on one agricultural machine and that change will appear on any device or machine connected to the host system.

The plurality of agricultural machines with onboard computing systems configured to access the host system include, for example, the tractor 16, the baler 18 and the sprayer 20, as explained above. The tractor 16 and the sprayer 20 are primary agricultural machines, as explained below, and include operator cabins 34, 36 and human-machine interfaces that include graphical user interfaces 38, 40. The baler 18 is configured for use with another machine, such as the tractor 16, but still communicates with the host system 12 indirectly through the tractor 16. The plurality of offboard electronic devices 28, 30 configured to access the host system 12 include portable or handheld electronic devices such as smartphones, tablet computers and laptop computers as well as other computing devices not integrated into an agricultural machine, such as table top computers or workstations. Offboard electronic devices are discussed in greater detail below. Some of the agricultural machines, such as the tractor 16 and the sprayer 20, include geographic positioning systems that use signals from GNSS satellites 46, as explained below.

The one or more third-party systems 32 configured to provide services via the plurality of agricultural machines 16, 18, 20, via the plurality of offboard electronic devices 28, 30, or both include systems associated with apps running on offboard devices, running on onboard computing systems of agricultural machines or both. Such third-party apps may include, for example, apps associated with gathering and analyzing machine or agronomic data, apps associated with farm operations management, and apps associated with storing or exchanging data.

As used herein, an agricultural machine is a mobile mechanical machine used in the agricultural industry and includes both primary machines and secondary machines (sometimes referred to as "implements"). A primary agricultural machine includes at least one internal source of power such as an internal combustion engine or an electric motor, includes one or more ground engaging elements such as wheels or tracks used for moving the machine along a ground surface as driven, either directly or indirectly, by the at least one source of power, and includes at least one system or device for performing an agricultural function such as a linkage for pulling or carrying a secondary agricultural machine, a spray system for applying a liquid product to an agricultural area, a header for cutting and gathering crop, or a processor for processing cut crop. A secondary agricultural machine is configured for use with a primary machine. Secondary machines may be coupled with or carried by a primary machine and, where necessary, may be powered by the primary machine via a power take-off attachment or a hydraulic or electric connection.

Examples of primary agricultural machines include tractors, combine harvesters, forage harvesters, sugarcane harvesters, windrowers, sprayers, fertilizer spreaders, bulldozers, earthmovers and excavators. Examples of secondary agricultural machines include planters, ploughs, discs, harrows, balers, wagons, combine headers and mower conditioners.

Figure 6:
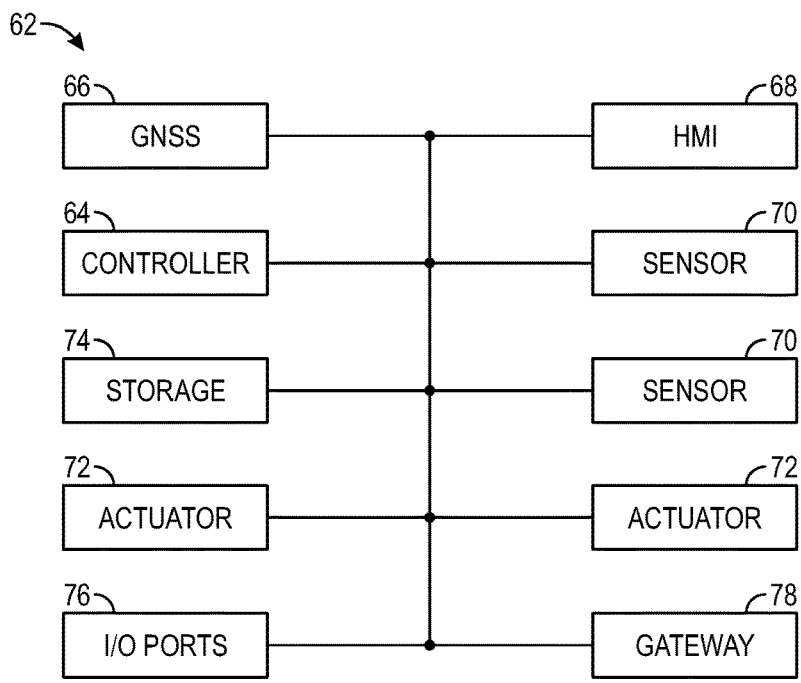
FIG. 6 is a diagram of an onboard computing system of an agricultural machine.

Agricultural machines also include onboard computing systems such as the systems 22, 24 and 26 mentioned above and described in greater detail below. An onboard computing system is a computing system that is integrated into an agricultural machine and includes, for example, one or more embedded computing devices sometimes referred to as electronic control units or ECUs. An onboard computing system also includes a human-machine interface (HMI) that may include one or more of touch-sensitive displays, buttons, switches, knobs, levers and the like. Both primary and secondary agricultural machines may include onboard computing systems. An example of an onboard computing system of an agricultural machine is illustrated in FIG. 6 and discussed below.

The onboard computing system of a secondary machine, such as the baler 18, may connect to and work with the onboard computing system of a primary machine, such as the tractor 16, through a wired or wireless data connection between the two onboard computing systems. Thus, the baler 18 may configured for data communications with the tractor 16 enabling a human operator to interact with the baler's onboard computing system by way of the tractor's human-machine interface 38. The onboard computing systems of the primary and secondary machines may conform to the ISOBUS standard, for example, which includes provisions for connecting the computing systems of two machines. The ISOBUS standard is discussed below.

As used herein, an offboard electronic device is a device that is not integrated into an agricultural machine. Examples of offboard electronic devices include multipurpose computing devices such as laptop computers, desktop computers, tablet computers and smartphones. Offboard electronic devices may be used remotely from agricultural machines, such as a laptop or tablet computer used in a home office that is geographically remote from any agricultural machine. Such devices may also be carried or placed in or on an agricultural vehicle and may be in communication with an electronic system of an agricultural machine via wired or wireless communications.

Figure 4:
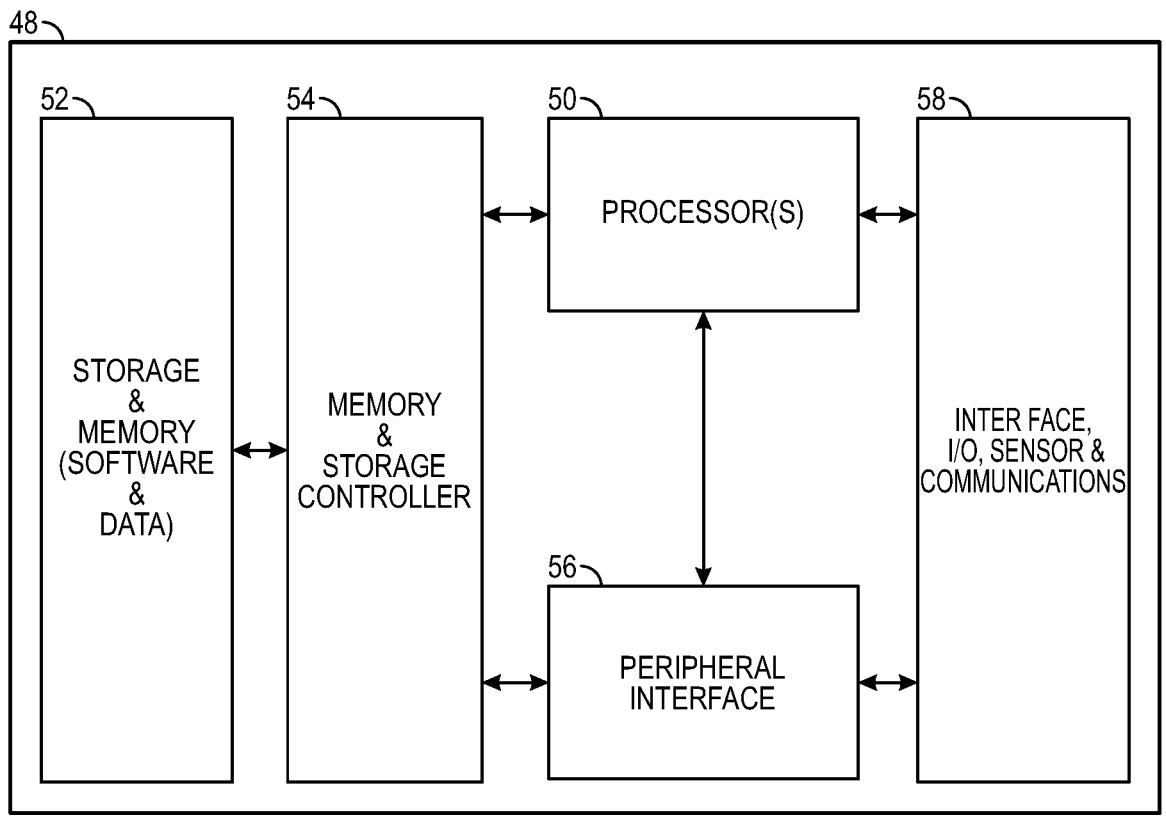
FIG. 4 is a schematic diagram of certain components of an offboard electronic device used in the integrated agricultural production system of FIG. 1.

A schematic diagram of certain components of an offboard electronic device 48 is illustrated in FIG. 4 and includes one or more computer processors 50, one or more memory and storage components 52, memory and storage controller circuitry 54, peripheral interface circuitry 56 and other hardware/circuitry 58 associated with user interface(s) (for example, a graphical user interface), input/output, sensors and communications (for example, wireless or wired network communications). The memory and storage component 52 stores computer software executable by the processor(s) 50, such as an operating system and applications, as well as data. The memory and storage controller 54 controls access to and communication with the memory 52 by the processor(s) 50 and the peripheral interface 56. When a software application is installed or run on the offboard electronic device 48 the executable computer instructions, as well as the data, associated with the app are stored in the storage and memory components and executed by the processor(s). The processor(s) 50, the peripheral interface 56 and/or the hardware and circuitry 58 associated with the interface, I/O, sensors and communications enable a human-machine interface such as a touchscreen through which a user interacts with the device. The processor(s) 50, the peripheral interface 56 and/or the hardware and circuitry 58 associated with the interface, I/O, sensors and communications also enable communications with the host system 12 by way of, for example, internet communications over a Wi-Fi or cellular connection. A more detailed description of an exemplary offboard electronic device is described below.

The table illustrated in FIG. 1 is a record or database used and maintained by the host system 12 indicating how offboard apps, onboard apps, external apps and settings are associated with each of multiple users, offboard electronic devices and agricultural machines. Each of the offboard apps may be authorized for one or more users and one or more offboard devices. Similarly, each of the onboard apps may be authorized for one or more users and one or more agricultural machines. Each of the external apps may be authorized for one or more users, one or more offboard devices and one or more agricultural machines. Settings may include agricultural machine settings and human-machine interface settings. Agricultural machine settings include, without limitation, maximum speed, allowed time periods of operation and allowed geographic areas of operation. Agricultural machine settings may be associated with a specific agricultural machine, associated with a user, or both.

Agricultural machine settings that are associated with a particular user, as well as human-machine interface settings, are associated with a user's account and follow the user from one agricultural machine to another and from one offboard device to another. In some situations settings associated with a user account may take precedence over settings associated with an agricultural machine, while in other situations settings associated with an agricultural machine may take precedence over settings associated with a user account. By way of example, a machine may have a maximum speed of fifty kilometers per hour that represents an upper speed limit regardless of a maximum speed associated with a present user. In this example, a maximum speed of thirty-five kilometers per hour may be assigned to a user, in which case the maximum speed allowed by the machine is thirty-five kilometers per hour while that user is operating the machine because the user's maximum speed takes precedence over the machine's maximum speed because the user's maximum speed is lower than the machine's maximum speed. If another user with a maximum assigned speed of forty-five kilometers per hour logs into the machine, the maximum speed allowed by the machine is forty-five kilometers per hour while that user is operating the machine. If another user with a maximum assigned speed of fifty kilometers per hour logs into the machine, the maximum speed allowed by the machine is forty-five kilometers per hour while that user is operating the machine because the machine's maximum speed is less than the user's maximum speed and, therefore, takes precedence over the maximum speed assigned to the present user.

Human-machine interface settings include such things as the look and feel of a visual display, the size and order of presentation of icons, and interface behaviors. If a user makes a change to a user interface setting that change is reflected across all offboard electronic devices and across all agricultural machines, as explained above. Changes to user interface settings are stored in the user's account.

Agricultural machine settings and onboard apps may be associated with a primary agricultural machine, such as the tractor 16 or the sprayer 20 illustrated in FIG. 1, or may be associated with a secondary agricultural machine, such as the baler 18 illustrated in FIG. 1. When a user is operating a primary machine in conjunction with a secondary machine (such as a tractor pulling a baler), the settings and apps associated with the user, associated with the primary agricultural machine and associated with the secondary agricultural machine all govern or inform the operation. In the exemplary scenario where a user is operating a tractor pulling a baler, any apps associated with the user (independently of a machine), any apps associated with the user and the tractor, as well as any apps associated with the user and the baler are available to the user via the tractor's human-machine interface. Similarly, in that scenario tractor settings associated with the user and baler settings associated with the user all apply to the operation.

The host system is configured to coordinate authorization of applications across multiple offboard electronic devices and across multiple agricultural machines. An application may be designed for use with both onboard computing systems and offboard electronic devices, for example, such that when a user purchases the app on an offboard electronic device the app becomes available not only on the device from which it was purchased, but also automatically becomes available on all of the agricultural machines associated with the host system 12. Examples of apps that may be used on both offboard devices and onboard computing systems include operations planning and logistics apps. An app may include a designation (provided, for example, by the creator of the app) that it is available for both electronic devices and agricultural machines. The host system 12 would recognize the designation and make the app available accordingly.

Two applications may be related but designed for use on different platforms—one for use with offboard electronic devices only and one for use with onboard systems only. A route planning/automated guidance app designed for use with an offboard electronic device may be closely related to an automated guidance app designed for use with an onboard computing system, wherein both apps enable the operator to define routes for performing tasks but only the onboard app enables automated guidance because it has access to the machine's propulsion and steering system. In this scenario if an operator purchases either the onboard app or the offboard app the host system automatically authorizes the related app. Another example of this is an app that is configured to monitor agricultural production. An offboard version of the app may track production trends across fields and crops, over time, etcetera, while a related onboard version of the app may include the same functionality but with the added function of determining yield as the agricultural machine in which it is installed performs harvesting operations. In this example different agricultural machines determine yield quite differently (for example, combine harvesters versus forage harvesters versus balers), and some agricultural machines do not determine yield at all (for example, sprayers and tillage implements). Therefore, each onboard app will be different for each machine but the present systems and methods facilitate the authorization and use of the app by making it available across multiple agricultural machines and across multiple offboard electronic devices with a single purchase.

Figure 5:
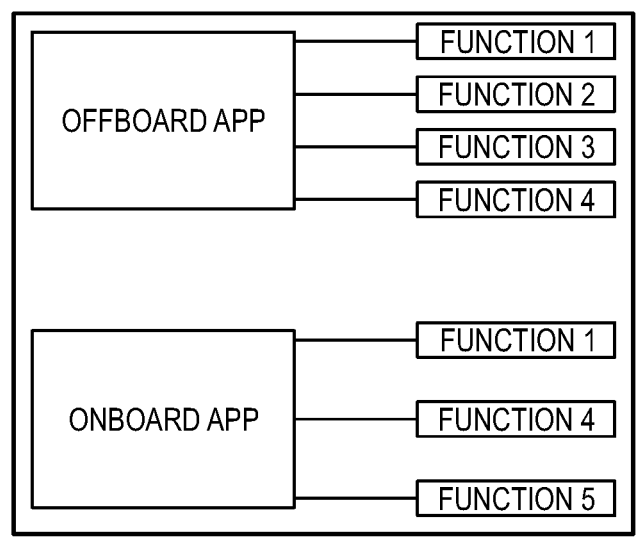
FIG. 5 is a diagram illustrating how different functions of an app may be enabled depending on whether the app is running on an offboard electronic device or an onboard system.

As explained above two applications may be related but designed for use with different platforms, for example one application being designed for use with an offboard electronic device and another, related application being designed for use with an onboard computing system. Similarly, and as illustrated in FIG. 5, a single application may be designed for use across multiple platforms and configured to implement different functions on different platforms. In the example illustrated in FIG. 5, when an application is installed on an offboard electronic application functions one through four are available. When the same application is installed on an onboard computing system functions one, four and five are available.

An onboard computing system 62 of an agricultural machine is illustrated in FIG. 6. The system 62 broadly includes a controller 64, a position determining device 66, a human-machine interface 68, one or more sensors 70, one or more actuators 72, one or more storage components 74, one or more input/out ports 76 and a communications gateway 78.

The position determining device 66 includes a global navigation satellite system (GNSS) receiver, such as a device configured to receive signals from one or more positioning systems such as the United States' global positioning system (GPS), the European GALILEO system and/or the Russian GLONASS system, and to determine a location of the machine using the received signals. The human-machine interface 68 includes components for receiving information, instructions or other input from a user and may include buttons, switches, dials, and microphones, as well as components for presenting information or data to users, such as displays, light-emitting diodes, audio speakers and so forth. The human-machine interface may include one or more touchscreen displays capable of presenting visual representations of information or data and receiving instructions or input from the user via a single display surface.

The sensors 70 may be associated with any of various components or functions of an associated machine including, for example, various elements of the engine, transmission(s), and hydraulic and electrical systems. One or more of the sensors 70 may be configured and placed to detect environmental or ambient conditions in, around or near a machine with which the system is associated. Such environmental or ambient conditions may include temperature, humidity, wind speed and wind direction. The actuators 72 are configured and placed to drive certain functions of the machine including, for example, steering when an automated guidance function is engaged. The actuators 72 may take virtually any form but are generally configured to receive control signals or instructions from the controller 64 (or other component of the system 62) and to generate a mechanical movement or action in response to the control signals or instructions. By way of example, the sensors 70 and actuators 72 may be used in automated steering of a machine wherein the sensors 70 detect a current position or state of steered wheels or tracks and the actuators 72 drive steering action or operation of the wheels or tracks. In another example, the sensors 70 collect data relating to the operation of the machine and store the data in the storage component 74, communicate the data to another machine or to a remote computing device via the communications gateway 78, or both.

The controller 64 includes one or more integrated circuits programmed or configured to implement the functions described herein. By way of example the controller 64 may be a digital controller and may include one or more general purpose microprocessors or microcontrollers, programmable logic devices, or application specific integrated circuits. The controller 64 may include multiple computing components placed in various different locations on the machine. The controller 64 may also include one or more discrete and/or analog circuit components operating in conjunction with the one or more integrated circuits or computing components. Furthermore, the controller 64 may include or have access to one or more memory elements operable to store executable instructions, data, or both. In the context of agricultural machines embedded controllers are often referred to as electronic control units or ECUs. The storage component 74 stores data and preferably includes a non-volatile storage medium such as optic, magnetic or solid state technology. The communications gateway 78 enables communications between the onboard computing system 62 and external systems or devices, such as offboard electronic devices, onboard computing systems of other machines, or both. The communications gateway 78 includes one or more wireless transceivers configured to communicate according to one or more wireless communications protocols or standards, such as one or more of protocols based on the IEEE 802.11 family of standards ("Wi-Fi"), the Bluetooth wireless communications standard, a 433 MHz wireless communications protocol or a protocol for communicating over a cellular telephone network.

It will be appreciated that, for simplicity, certain elements and components of the onboard computing system 62 have been omitted from the present discussion and from the drawing of FIG. 6. A power source or power connector is also associated with the system 62, for example, but is conventional in nature and, therefore, is not discussed herein. Another embodiment of an onboard computing system spanning multiple agricultural machines is described below in greater detail and illustrated in FIG. 10. It will be appreciated that the onboard computing system 62 illustrated in FIG. 6 may use the standards and technology illustrated in FIG. 10 or may use other standards and technology. It will further be appreciated that the system 62 illustrated in FIG. 6 and the system illustrated in FIG. 10 both may be used to implement the systems and methods described herein.

Figure 7:
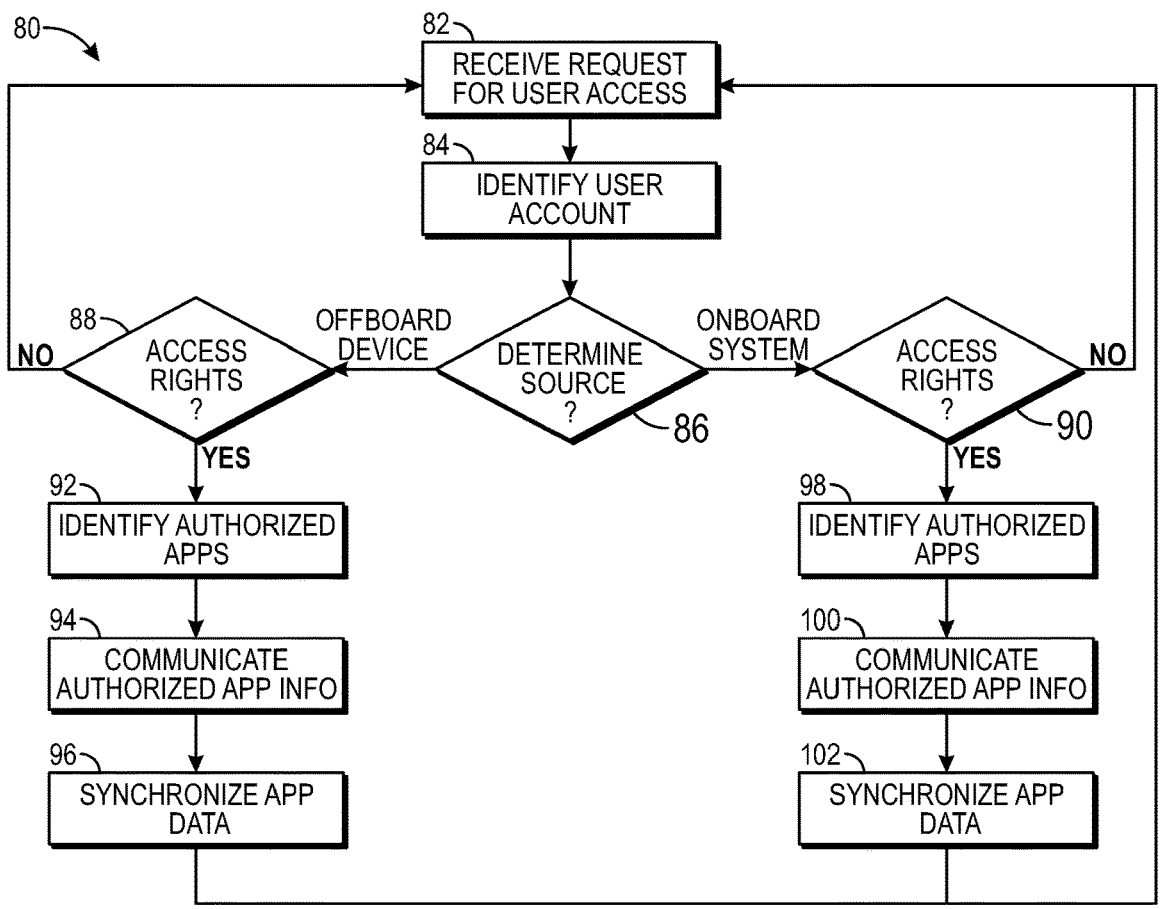
FIG. 7 is a flow diagram illustrating a first method of using a host system of FIG. 1.

With reference to FIG. 7, a method 80 of using the host system 12 of FIG. 1 according to an embodiment is illustrated. The method illustrated in FIG. 7 is implemented by one or more computing devices implementing the host system for maintaining a plurality of user accounts, each of the user accounts including offboard electronic device information and agricultural machine information specific to a user, as explained above. The offboard electronic device information includes, without limitation, device access rights, offboard application access rights and offboard application data for at least one offboard electronic device. The agricultural machine information includes, without limitation, agricultural machine access rights, user onboard application access rights, machine onboard application access rights and machine onboard application data for at least one agricultural machine, as explained above.

The host system 12 is configured to receive a request for user access, as depicted in block 82, the request for user access including user identification information and source identification information. The request for user access comes from either an offboard electronic device (such as, for example, one of the devices 28, 30) or an onboard computing system of an agricultural machine (such as, for example, one of the onboard computing systems 22, 24, 26 of one of the machines 16, 18, 20). The source identification information uniquely identifies the electronic device (if the source is an offboard electronic device) or the agricultural machine (if the source is an onboard computing system) and includes an alpha-numeric identifier unique to the device or machine through which the user submitted the request. The user identification includes one or more alpha-numeric identifiers unique to the user account of the person requesting access and may include a username or password (or both) or similar information.

The host system 12 then uses the user identification information to identify a user account from the plurality of user accounts corresponding to the request for user access, as depicted in block 84, and uses the source identification information to determine whether the source of the request for user access is an offboard electronic device or an onboard computing system of an agricultural machine, as depicted in block 86. The host system 12 uses the source identification information and information from the user account corresponding to the request for user access to determine whether the user has access rights to the offboard electronic device, as depicted in block 88, or to the agricultural machine, as depicted in block 90.

If the source of the request for user access is an offboard electronic device and the user has access rights to the offboard electronic device, the host system 12 identifies offboard applications that are authorized for the offboard electronic device according to the user account, as depicted in block 92. The host system 12 identifies the offboard applications that are authorized for the offboard electronic device by accessing the database associated with the user account described above and illustrated in FIG. 1. Once the host system 12 has identified the offboard applications associated with the user account, it communicates the authorized offboard application information to the offboard electronic device, as depicted in block 94, wherein the authorized offboard application information enables operation of authorized offboard applications on the offboard electronic device. The host system 12 synchronizes offboard application data between the offboard electronic device and the host system, as depicted in block 96.

If the source of the request for user access is an onboard computing system and the user has access rights to the agricultural machine, the host system 12 identifies onboard applications that are authorized for the user and that are authorized for the agricultural machine according to the user account, as depicted in block 98. The host system 12 identifies the onboard applications that are authorized for the agricultural machine by accessing the database associated with the user account described above and illustrated in FIG. 1. The onboard applications run on the onboard computing system and enabling functionality of mechanical systems of the agricultural machine. An onboard application may be authorized for a particular agricultural machine only if the application is designed for use with that particular machine. An application related to processing harvested crop, for example, may be designed for use with various models of combine harvester. An application related to automated guidance may be designed for use with various models of tractors, combine harvesters, forge harvesters, sprayers and windrowers.

The host system 12 then communicates authorized onboard application information to the onboard computing system, as depicted in block 100, wherein the authorized onboard application information enables onboard applications. The host system 12 synchronizes onboard application data between the onboard computing system of the agricultural machine and the host system 12, as depicted in block 102.

Figure 8:
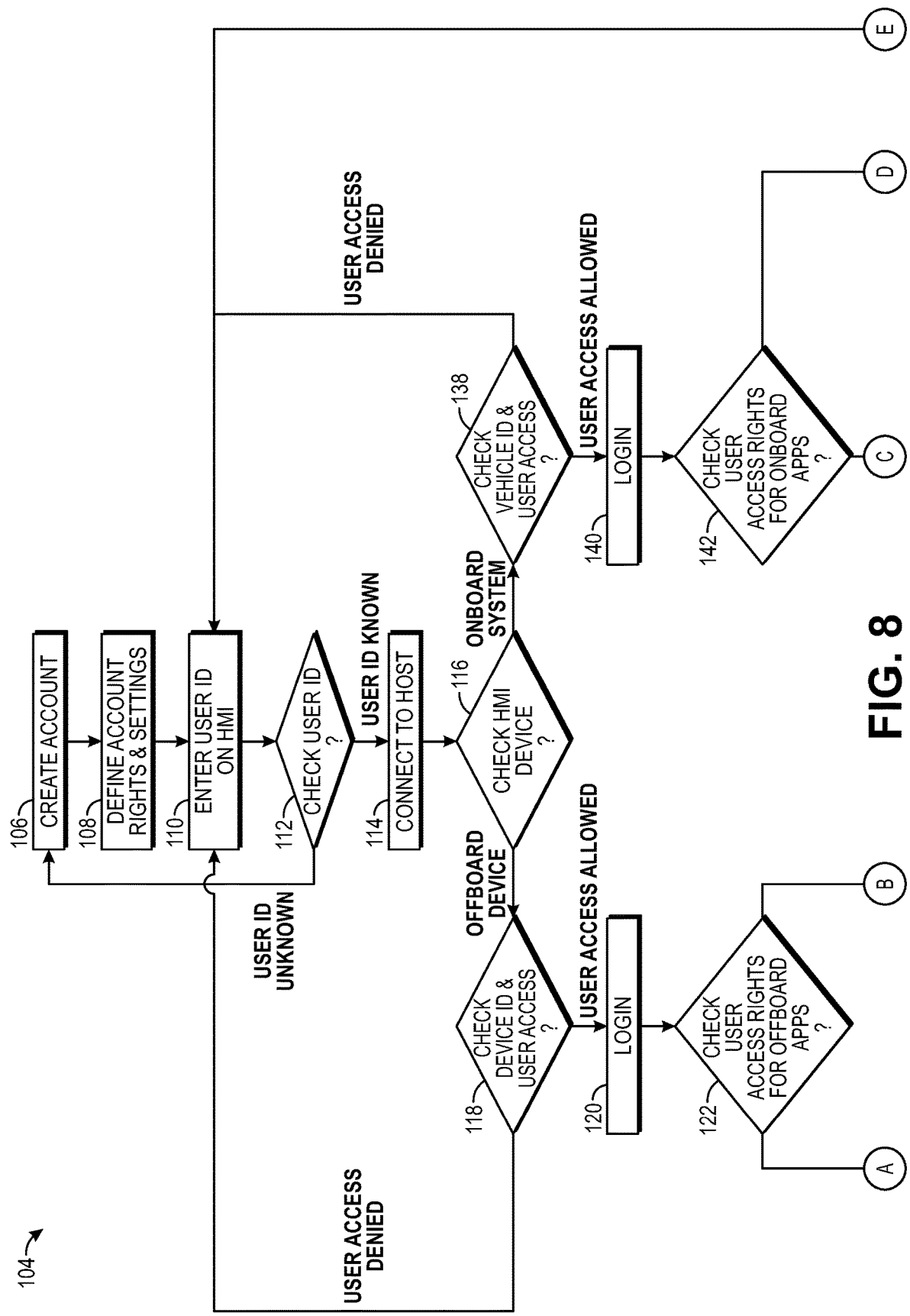
FIG. 8 is a flow diagram illustrating a second method of using the host system of FIG. 1.
Figure 8:
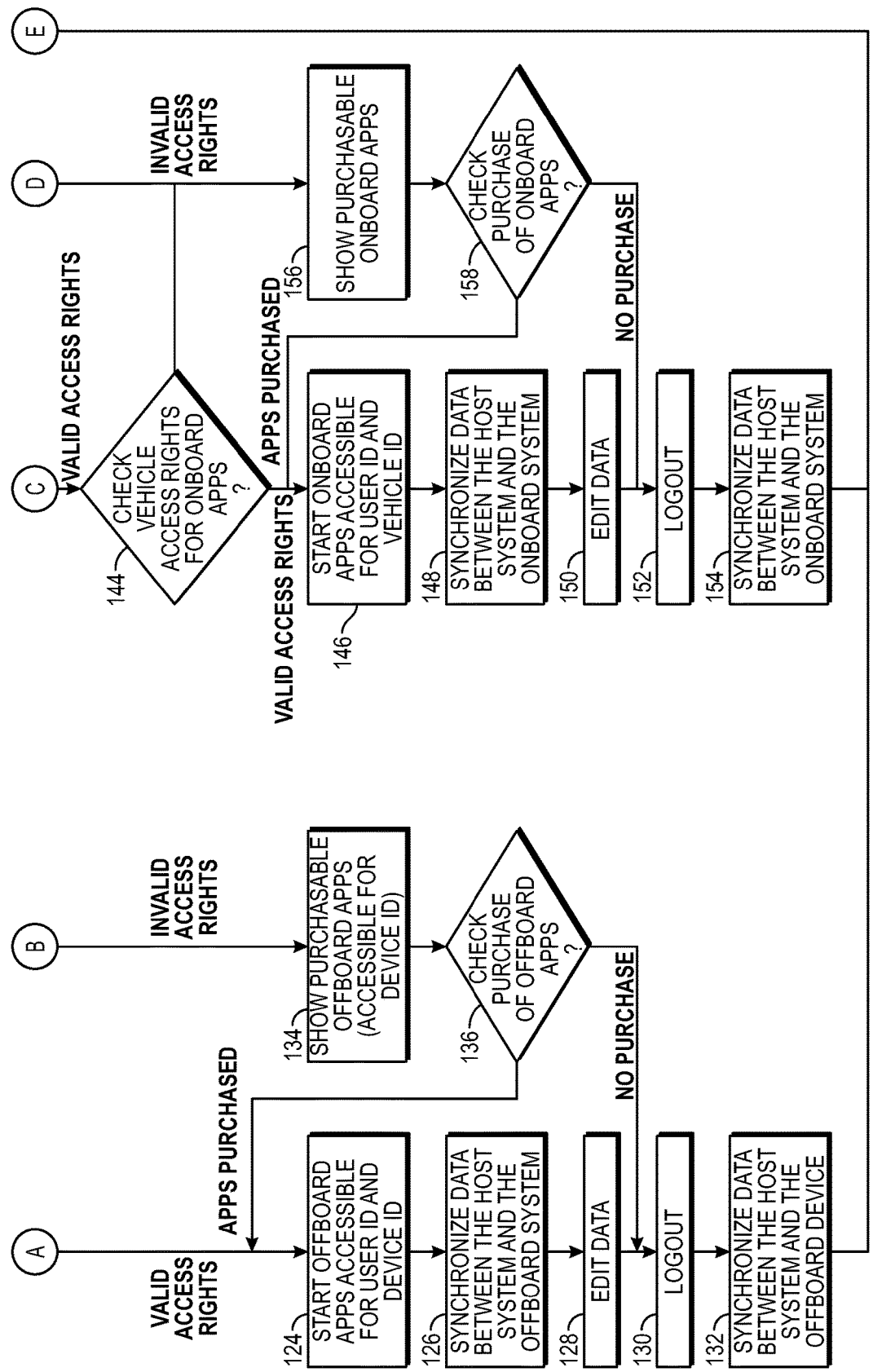

With reference to FIG. 8, a method 104 of using the host system 12 of FIG. 1 according to another embodiment is illustrated. The method 104 illustrated in FIG. 8 involves one or more computing devices implementing the host system 12 for maintaining a plurality of user accounts, each of the user accounts including offboard electronic device information and agricultural machine information specific to a user, as explained above. The offboard electronic device information includes device access rights, offboard application access rights and offboard application data for at least one offboard electronic device. The agricultural machine information includes agricultural machine access rights, user onboard application access rights, machine onboard application access rights and machine onboard application data for at least one agricultural machine, as explained above.

If a user does not have an existing user account her or she creates a user account, as depicted in block 106, including user identifying information such as a user ID and password. This step is performed by way of the human-machine interface of either the offboard electronic device or the onboard computing system, and the offboard electronic device or the onboard computing system communicates the new account information to the host system 12 for recording.

After the new user account is created rights and settings are associated with the account, as depicted in block 108. Rights associated with the account include apps purchased or otherwise accessible by the user, authorization to use particular machines or implements, authorization to use a particular implement with a particular vehicle, the maximum length of time the user is authorized to use a particular machine or implement, purchase and/or access rights related to purchasing and/or downloading applications, user management rights, rights to transfer data between onboard and offboard applications, and rights to change settings. Settings associated with an account include maximum speed and geographic limitations of agricultural machine operation, the look and feel of a display including font size and type, size and arrangement of application icons and payment information such as credit card or bank account information. Some rights and settings may be determined by the user, such as where the user purchases apps, and some rights and settings may be determined by a third party. An example of a third party determining rights and settings for a user account is the owner of a fleet of agricultural machines determining which of the agricultural machines the user has access to as well as the settings associated with the user for each of the machines the user has access to.

When the user account is set up the user accesses the account by submitting his or her user ID via the human-machine interface of an onboard agricultural machine system or an offboard electronic device, as depicted in block 110. The system or device checks the user ID submitted by the user, as depicted in block 112, by determining whether there is a user account in the database associated with the user ID. If the system or device does not recognize the user ID it gives the user the option of creating a new account. If the system or device confirms that the user ID is valid it connects to the host system 12, as depicted in block 114, by establishing communications with the one or more computing devices 14 implementing the host system 12.

The host system 12 determines whether the source (that is, the device or system through which the user submitted his or her user ID) is an offboard device or an onboard computing system, as depicted in block 116. If the source is an offboard electronic device the host system determines whether the user has access rights associated with the device, as depicted in block 118. Assigning access rights to offboard electronic devices allows a producer to determine which employees or personnel will be able to access the system from which devices.

If the user has access rights, the host system 12 logs the user into the system, as depicted in block 120. The host system 12 then determines which apps, if any, are authorized for both the user and the offboard electronic device, as depicted in block 122, and launches the authorized apps on the offboard electronic device, as depicted in block 124. Launching the apps on the offboard electronic device may include the host system 12 communicating authorization information to the offboard device wherein the offboard device launches the apps. A unique set of applications may be associated with each device such that a different set of applications will be launched according to the particular offboard electronic device the user has logged into.

App data is stored by the host system 12 and associated with the user's account. Data is synchronized between the host system 12 and the offboard electronic device when the user logs into the system, as depicted in block 126. This step may involve communicating data from the host system 12 to the offboard electronic device that reflects the latest user interface preferences and other settings as well as the latest data associated with the apps authorized for the user and the device. While using the apps the user edits the data, as depicted in block 128, and when the user logs out of the system (block 130), data is synchronized between the offboard electronic device and the host system, as depicted in block 132. Because the app data is synchronized between the offboard electronic device and the host system 12, all changes to the user interface (for example, the look and feel, the presentation size and order of icons, and other user preferences) and all changes to the state of the apps made while using the app on a first offboard electronic device are reflected when the app is launched on a second offboard electronic device or when the app is launched on an onboard computing system of an agricultural machine. A user may run an app on an offboard electronic device, for example, to define machine route plans for a task in a field. The route plan data is synchronized between the offboard device and the host system 12, and when the user opens the same app via a user interface of an agricultural machine the route plan data is synchronized between the host system 12 and the app running on the agricultural machine. The user may then use the route plan data for automated guidance of the agricultural machine in the field. Similarly, information generated or collected by the app when running on the onboard computing system of the agricultural machine (for example, changes to the route plans or completion of the task) is synchronized with the host system 12 and reflected when the app is run on another agricultural machine or on an offboard electronic device.

Returning to block 122, if the host system 12 determines that no apps are authorized for both the user and the offboard electronic device, the host system 12 presents the user with a list of purchasable offboard apps accessible for the offboard device, as depicted in block 134. The host system 12 determines whether the user purchased an offboard app, as depicted in block 136. If the user purchases an offboard app the app is launched (block 124), and if the user does not purchase an offboard app the user can log out of the system (block 130).

Returning to block 116, if the source is an onboard computing system the host system 12 determines whether the user has access rights to the vehicle, as depicted in block 138. If the user has access rights, the host system 12 logs the user into the system, as depicted in block 140. The host system 12 then determines which onboard apps, if any, are authorized for the user, as depicted in block 142. If there is at least one onboard app authorized for the user the host system 12 then determines if any of the one or more onboard apps authorized for the user are also authorized for the agricultural machine, as depicted in block 144.

If there are any onboard apps authorized for both the user and the agricultural machine, the host system 12 launches the authorized apps on the onboard computing system, as depicted in block 146. Launching the apps on the machine's onboard computing system may include the host system 12 communicating authorization information to the onboard system wherein the onboard system launches the apps.

Data is synchronized between the host system 12 and the onboard computing system when the user logs into the system, as depicted in block 148. This step may involve communicating data from the host system 12 to the onboard computing system that reflects the latest user interface preferences and other settings as well as the latest data associated with the apps authorized for the user and the onboard computing system. While using the apps the user edits the data, as depicted in block 150, and when the user logs out of the system (block 152), data is synchronized between the onboard computing system and the host system, as depicted in block 154. Because the app data is synchronized between the onboard computing system and the host system 12, all changes to the user interface (for example, the look and feel, the presentation size and order of icons, and other user preferences) and all changes to the state of the apps made while using the app on a first agricultural machine are reflected when the app is launched on a second agricultural machine or when the app is launched on an offboard electronic device.

Returning to blocks 142 and 144, if the host system 12 determines that no apps are authorized for the user or the agricultural machine, the host system 12 presents the user with a list of purchasable onboard apps for the agricultural machine, as depicted in block 156. The host system 12 determines whether the user purchased an onboard app, as depicted in block 158. If the user purchases an onboard app the app is launched (block 146), and if the user does not purchase an onboard app the user can log out of the system (block 152).

Advantages of the systems and methods described herein include continuity of control, functionality, data and user experience between agricultural machines and offboard electronic devices. Traditionally, onboard computing systems of agricultural machines have been isolated from external systems in many ways. Applications purchased for or otherwise used on a computer in a producer's office were separate from any software running on the producer's agricultural machines. If a complementary or related software application was to be used on an agricultural machine the producer had to find a way to install, or have installed, the software on the agricultural machine (if the software was available at all for the machine). The producer had to do this for each machine in his or her operation. Furthermore, interacting with an agricultural machine's human-machine interface was a distinct experience from interacting with the human-machine interface on offboard electronic devices and from interacting with the human-machine interface of other machines. Traditionally, each device and each agricultural machine had its own user interface settings, appearance, functionality and software, each had to be configured and set up separately, and any changes made to one device or machine would have to be made to each other device or machine separately.

The systems and methods described herein address these deficiencies in the art by providing a system and computer software for enabling the integration of control, functionality, data and user experience across onboard systems and offboard devices in an agricultural production environment. Using the present systems and methods, for example, agricultural machines are no longer separate and isolated computing systems but are part of a larger electronic ecosystem wherein changes made by users on a single machine or offboard electronic device are reflected across multiple agricultural machines and multiple offboard electronic devices; where the purchase or installation of an app on a first agricultural machine automatically makes the app available on one or more other agricultural machines or offboard electronic devices if the app is so configured; where an operator finds the same user interface in each of his offboard devices and agricultural machines and therefore does not have to learn multiple user interfaces.

Figure 9:
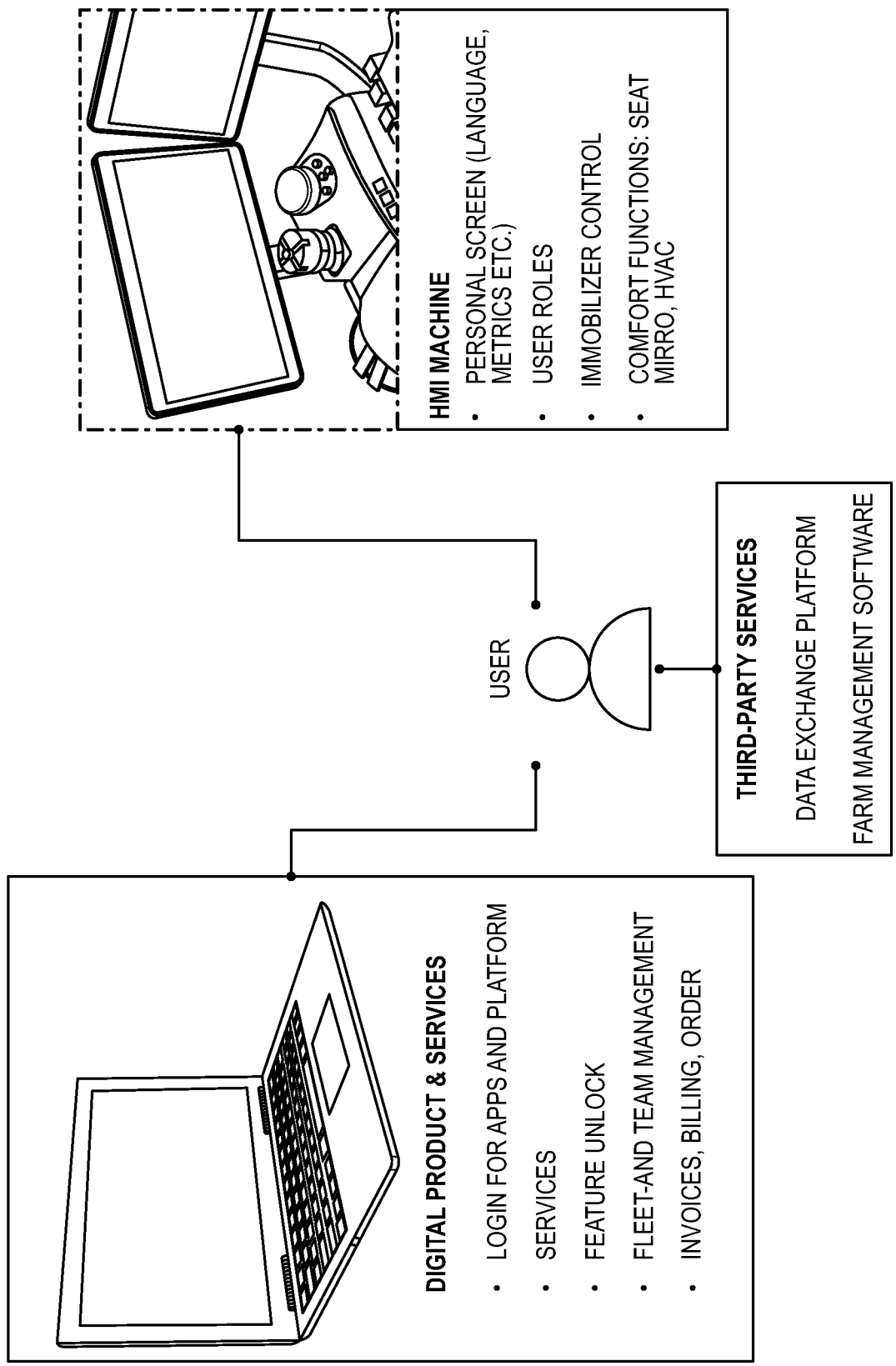
FIG. 9 is a diagram illustrating an aspect of how the system of FIG. 1 integrates various aspects of an agricultural production system and creates continuity of control, functionality, data and user experience in an exemplary offboard electronic device, an exemplary onboard computing system of an agricultural machine and exemplary third-party services.

FIG. 9 illustrates one aspect of how the present system integrates various aspects of an agricultural production system and creates continuity of control, functionality, data and user experience in an exemplary offboard electronic device, an exemplary onboard computing system of an agricultural machine and exemplary third-party services. While the onboard computing system of the agricultural machine retains certain functionality that is unique to an agricultural machine (for example, comfort functions such as seat position, mirror placement and environmental control (HVAC) settings), the look and feel and the functionality of the graphical user interface of the agricultural machine is nearly identical to that of the offboard electronic device.

Figure 10:
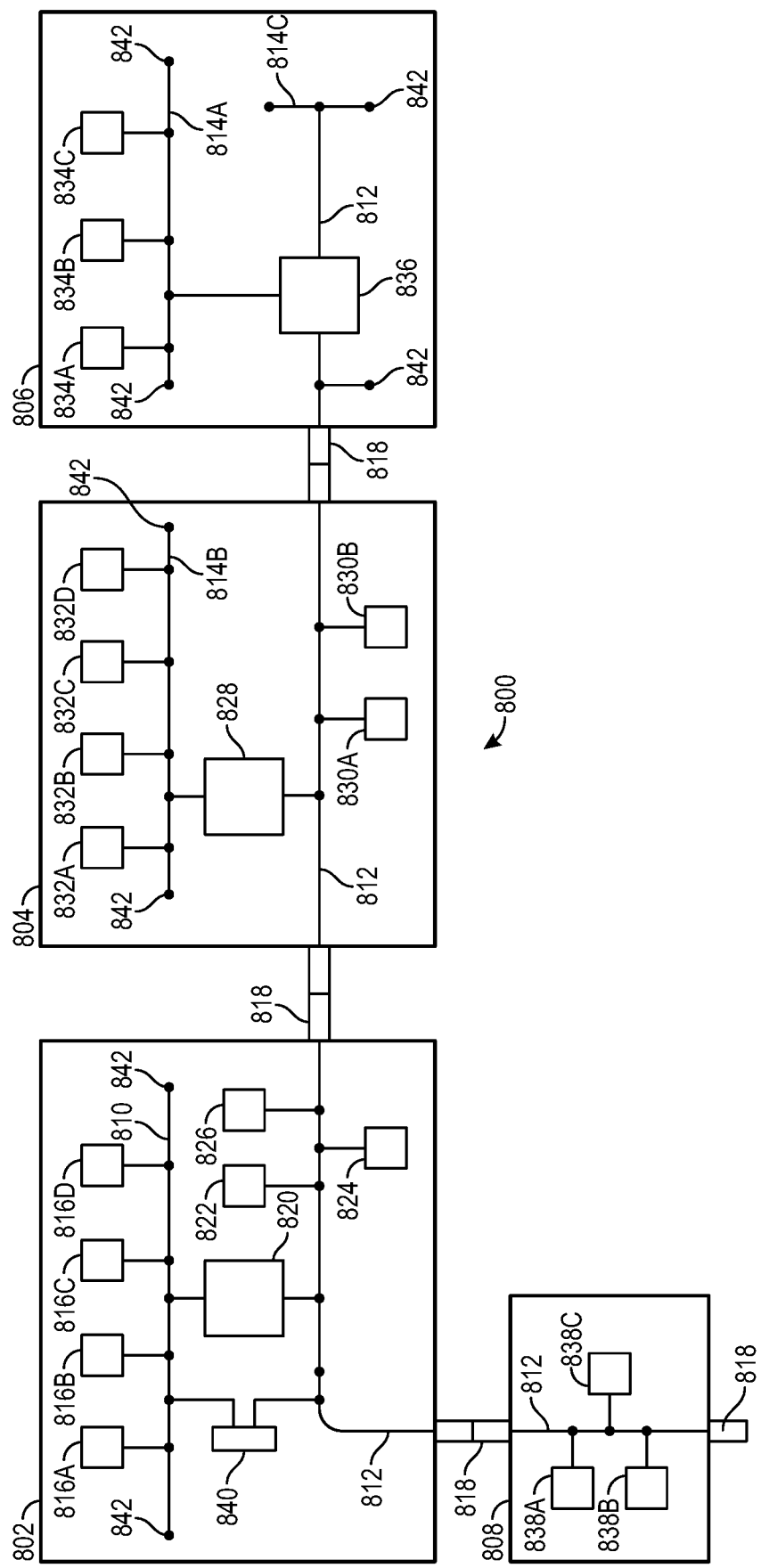
FIG. 10 is an exemplary embodiment of an onboard computing system spanning multiple agricultural machines.

With reference to FIG. 10, multiple onboard computing systems may be connected to form a single multi-machine system 800 that spans multiple interconnected agricultural machines. The system 800 conforms to the International Standard Organization's ISO 11783 standard, also referred to herein as the "ISOBUS standard" or simply "ISOBUS". The ISOBUS standard is designed to enable the electrical systems of different agricultural machines to interact, regardless of the type of machine or the manufacturer. More specifically, ISOBUS standardizes the method and format of data transfer between sensors, actuators, control elements, and information storage and information display units, whether mounted on, or part of, a primary machine (for example, a tractor) or one or more secondary machines (for example, an implement). In use, when the operator of an ISOBUS-enabled tractor attaches an ISOBUS-enabled implement such as a sprayer, baler or seeder to the tractor, the operator establishes an ISOBUS connection by physically attaching a connector of the implement to a connector of the tractor. Once the physical connection is established, the electrical systems of both machines automatically begin exchanging communication and control information. During operation the tractor may communicate speed information to the implement, for example, and the implement may communicate performance and status information to the tractor for presentation to the operator via a virtual terminal.

The ISOBUS standard defines various aspects of the onboard computing system including physical interconnections, network communication layers and network management, messaging, a task controller, diagnostics and even a standardized computer file server. ISOBUS uses a shared wiring concept that allows tractor and implement controllers to efficiently communicate over a single pair of wires, reducing the complexity of the system and the risk of failure. ISOBUS systems do not use a centralized controller, but rather allow multiple controllers (called electronic control units or "ECUs") to access the bus simultaneously, using a prioritized transmission process to grant access to the bus. All networked electronics can be diagnosed through one connection to the bus.

ISOBUS systems may use the Controller Area Network (CAN) protocol defined in the ISO 11898 standard for physical and data link layer communications. The CAN protocol allows multiple controllers within a machine or system to communicate with each other without the need for a host computer or other single master controller. Devices attached to a CAN network typically include sensors, actuators and control devices. Such devices may include a host processor and a CAN controller connected to a CAN communications bus.

In the illustrated embodiment, the system 800 is associated with a tractor 802 and a plurality of implements 804, 806, 808 associated with the tractor 802, including two rear-mounted or towed implements 804, 806 and a front- or side-mounted implement 808. ISOBUS generally supports two network segments, including a tractor network 810 and an implement network 812, that can each include one or more subnetworks 814. As used within the context of the exemplary system 800 illustrated in FIG. 10, the term "tractor" broadly refers to a primary agricultural machine or the main power unit of a system and, therefore, may be a tractor according to the conventional meaning of the word or may be another primary agricultural machine. By way of example, a combine harvester connected to a header or pulling a grain wagon or other machine may be a "tractor" in an ISOBUS-enabled system.

The tractor network 810 provides the control and data communications for the drive train and chassis of the tractor 802 and connects to components 816 associated with the engine, the transmission, brakes and a hitch controller. The particular components and implementation details of the tractor network 810 are typically determined by the tractor manufacturer. The implement network 812 enables control and data communications between two or more implements and between the tractor and one or more implements. The implement network 812 spans the tractor 802 as well as the plurality of implements 804, 806, 808 and may be interconnected between the tractor and the various implements via breakaway connectors 818. Both the tractor network 810 and a portion of the implement network 812 may be built into the tractor's systems by the original manufacturer. A tractor ECU 820 is part of both the tractor network 810 and the implement network 812 and provides electrical and logical/message isolation between the two networks. By way of example, the tractor ECU 820 receives and interprets requests from the implement network 812 and communicates with one or more ECUs on the tractor network 810 to respond to the requests. Each implement 804, 806, 808 provides connections for extending the implement network 812 to additional implements that would be connected in a serial manner. The portion of the implement network 812 implemented on the tractor may also include a virtual terminal device 822, a management computer gateway 824 and a task controller 826.

The virtual terminal device 822 provides an operator interface for the tractor 802 and any implements connected to the tractor 802 using standardized control and messaging associated with the ISOBUS network. In the illustrated embodiment, the virtual terminal device 822 is connected to the implement network 812 on the tractor 802, but the tractor ECU 820 and other ECUs in the tractor 802 that are connected to the tractor network 810 can also access and use the virtual terminal 822. When an ISOBUS-compliant implement is connected to the tractor 802, the virtual terminal device 822 detects the presence of the implement and downloads virtual terminal data unique to that implement from an ECU on board the implement. The virtual terminal device 822 uses the virtual terminal data to generate a touchscreen with buttons, tabs, indicators and/or other elements associated with the implement. Each implement may provide its own virtual terminal data, and if multiple implements are connected to the ISOBUS system the operator may toggle a display of the device 822 between the various implements. Each ISOBUS-ready implement includes all of the data needed to operate its various functions electronically using an ISOBUS-compliant terminal in the cabin of the tractor 802. By way of example, an operator may raise and lower the pickup on a bailer or forage wagon using the virtual terminal 822, or may open and close the hopper slides on a fertilizer spreader.

ISOBUS virtual terminals have a common display format—they use the same style to show an implement's settings, they are adjusted in the same way and the graphical representation of various functions has the same look and feel on every terminal. Virtual terminals for a fertilizer spreader and a forage wagon will have different functional content, for example, but they are similar enough in look, feel and structure that an operator with experience operating one will feel comfortable operating the other with little or no preparation or instruction. The device 822 may be portable such that it may be moved from one machine to another.

The task controller 826 enables scheduled control of implement functions via the ISOBUS network. Task data received via the management computer gateway 824 is stored in the task controller 826, which then schedules the tasks and sends control messages to the appropriate control function for execution on the implement network 812. The task controller 826 also records data received from the control functions as tasks are being completed. This data is communicated back to a farm management computer through the management computer gateway 824. Thus, the management computer gateway 824 provides an interconnection between the ISOBUS system and the external farm management computer.

The implement 804 includes a portion of the implement network 812 and a subnetwork 814b interconnected via a network interconnect unit 828. Each of the implement network 812 and the implement subnetwork 814b includes a plurality of ECUs and/or other components 830, 832. The network interconnect unit 828 may be required to maintain network electrical load limits if the subnetwork 814b includes a large number of nodes. The implement 806 also includes a portion of the implement network 812, an ISOBUS subnetwork 814a with associated components 834 (e.g., ECUs, lighting controllers, etcetera), and a second subnetwork 814c associated with a different standard, both connected to the implement network 812 via a network interconnect unit 836. Thus, the network interconnect unit 836 may be used to isolate and bridge network segments with different architectures. The implement 808 includes a plurality of ECUs or other components 838 connected to the implement bus 812.

The system 800 may further include a diagnostic connector 840 and a plurality of bus terminators 842. Other components, such as a power source or connector, are not illustrated. Many aspects of ISOBUS systems are determined by machine manufacturers and will vary from one system to another.

In an exemplary scenario, a tractor and a pulled sprayer are ISOBUS-enabled. The tractor and the sprayer may be made by different manufacturers, but when the sprayer is connected to the tractor's ISOBUS system the sprayer's virtual terminal appears on the virtual terminal 822. The operator can then read flow meters, change rates and operate control valves via the virtual terminal inside the tractor's cab. The operator can also raise or lower spray boom sections, turn sections of the boom on and off, and map the spray application using a GNSS-enabled device.

The system 800 is an example of an ISOBUS-compliant system that may form part of and/or may be used by embodiments of the systems and methods described herein and recited in the claims. The system 800 may vary substantially from one embodiment to another, and may or may not be ISOBUS compliant, without departing from the spirit or scope of the present teachings.

Figure 11:
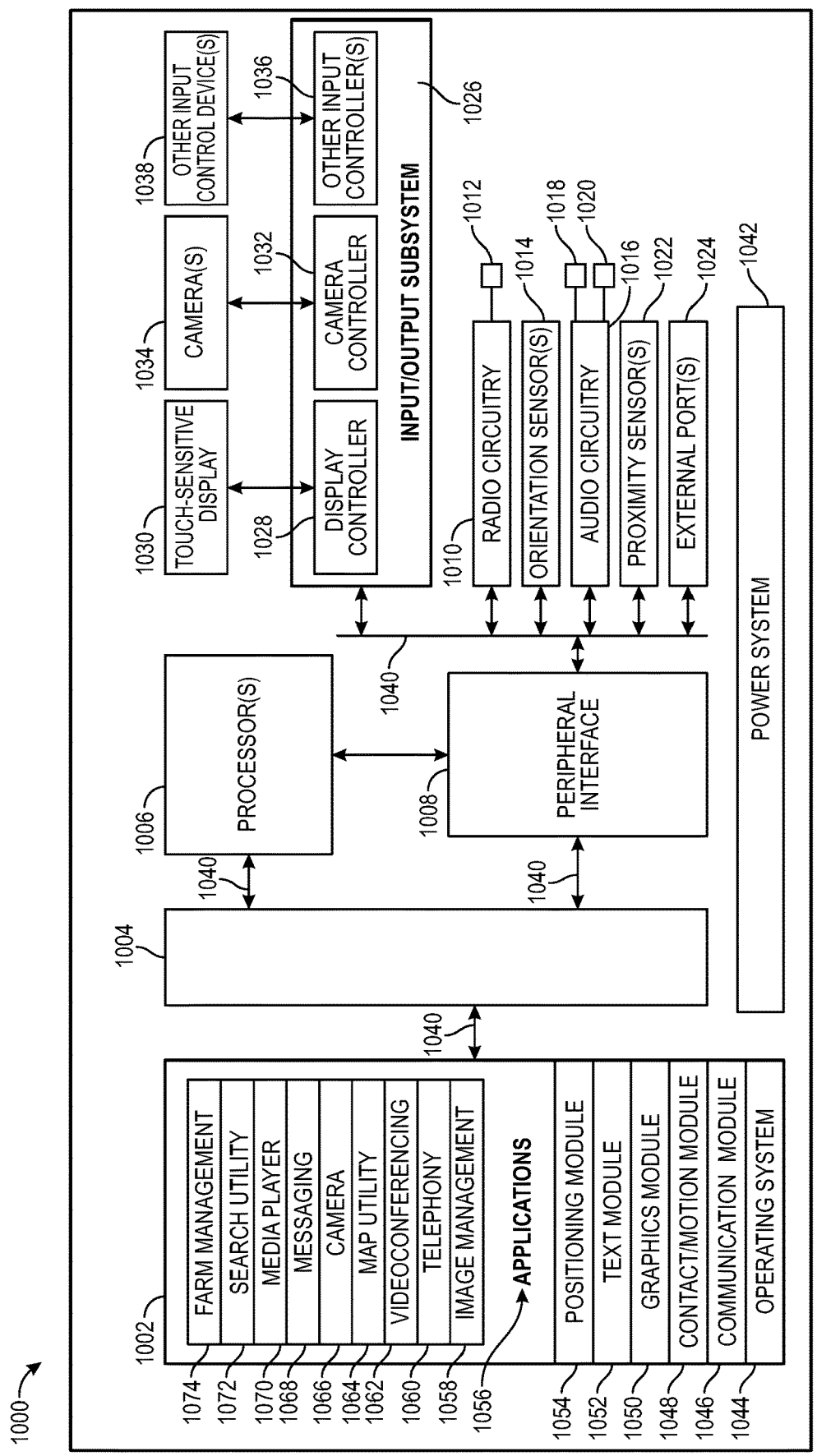
FIG. 11 illustrates a block diagram of an exemplary multifunction computing device.

FIG. 11 illustrates a block diagram of an exemplary multifunction computing device 1000 constructed in accordance with some embodiments. In some embodiments the device 1000 is a portable or handheld communications device such as a telephone that includes other functionality including a camera for capturing still images and video, a media player for playing audio and video, and so forth. In some embodiments the multifunction computing device is not portable or handheld, such as where the device is a desktop computer or workstation. Specific embodiments of multifunction computing devices include smartphones such as the Apple iPhone® and Samsung Galaxy®, tablet computers such as the Apple iPad® and Samsung Galaxy Tab®, laptop computers, desktop computers and workstations. The multifunction computing device as illustrated and described below includes a touch-sensitive display system, also referred to as a touchscreen. It will be understood, however, that the device may include other physical user-interface devices such as a physical keyboard, a mouse, a trackpad or a combination thereof.

The device 1000 supports a variety of software applications, sometimes referred to simply as "apps." Software applications running on the device 1000 may include communications applications including voice (telephone) applications, video conferencing applications, electronic mail (email) applications and messaging applications; work productivity applications including presentation applications, word processing applications and spreadsheet applications, task creation and tracking applications and calendar applications; media applications including digital audio player applications and digital video player applications; web browsing applications; game applications; and file management applications.

The device 1000 includes a memory 1002 (which may include one or more computer readable storage mediums), a memory controller 1004, one or more computer processors 1006, a peripheral interface 1008, radio (RF) circuitry 1010 including one or more antennas 1012, one or more orientation sensors 1014, audio circuitry 1016, microphone 1018, speaker 1020, one or more proximity sensors 1022, one or more external ports 1024 and an input/output subsystem 1026. The input/output subsystem 1026 includes a display controller 1028 and a touch-sensitive display system 1030, a camera controller 1032 and one or more cameras 1034, one or more other input controllers 1036 and one or more other input control devices 1038. These components communicate over one or more data buses 1040 or similar communication lines.

A power system 1042 provides electrical power to or otherwise energizes the other components of the device 1000. The power system 1042 includes one or more power sources such as a battery and a power port for connecting to an external power source. The power system 1042 may further include a power management system, a recharging system, a power failure detection circuit, a power converter or inverter, a power status indicator such as a light-emitting diode (LED), and any other components associated with the generation, management and distribution of power in the device 1000.

Memory 1002 stores information for immediate use by the processor(s) 1006 and by the peripheral interface 1008. Memory 1002 includes random access memory or similar non-volatile memory technology for storing computer readable data. Access to memory 1002 by other components of the device 1000, such as the processor(s) 1006 and the peripheral interface 1008, is controlled by the memory controller 1004. The peripheral interface 1008 provides a physical and logical interface between the processor(s) 1006 and various peripheral components including radio circuitry 1010, orientation sensors 1014, audio circuitry 1016, proximity sensor 1022 and external ports 1024. The one or more computer processors 1006 include digital integrated circuits for executing computer software applications, also referred to as "apps" as explained above.

The radio circuitry 1010 receives and transmits radio frequency (RF) signals, which are a form of electromagnetic signals. The radio circuitry 1010 converts electrical signals to/from electromagnetic signals and communicates with communications networks and other communications devices via the electromagnetic signals. The radio circuitry 1010 includes well-known circuitry and components for performing these functions including, without limitation, one or more antennas 1012, transceivers, amplifiers, tuners, oscillators, digital signal processors, a coder/decoder (codec) chipset, a subscriber identity module (SIM) card, memory and so forth. Radio circuitry 1010 is configured to communicate with networks, such as the internet, intranets, wireless networks such as the cellular telephone network, wireless local area networks (LANs), metropolitan area networks (MANs), and other devices via wireless communication.

The radio circuitry 1010 may use wireless communication according to any of various communications standards, protocols and technologies including, without limitation, the Global System for Mobile Communications (GSM), Enhanced Data GSM Environment (EDGE), high-speed downlink packet access (HSDPA), high-speed uplink packet access (HSDPA), code division multiple access (CDMA), wideband code division multiple access (W-CDMA), time division multiple access (TDMA), Bluetooth, Wireless Fidelity (Wi-Fi) (for example, IEEE 802.11a, IEEE 802.11b, IEEE 802.11g and/or IEEE 802.11n), Voice Over Internet Protocol (VoIP), Wi-MAX, a protocol for e-mail (for example, Internet message access protocol (IMAP) and/or post office protocol (POP)), instant messaging (for example, extensible messaging and presence protocol (XMPP), Session Initiation Protocol for Instant Messaging and Presence Leveraging Extensions (SIMPLE), Instant Messaging and Presence Service (IMPS)), and/or Short Messaging Service (SMS), or any other suitable communication protocol, including communication protocols not yet developed as of the filing date of this document.

The audio circuitry 1016, microphone 1018 and speaker 1020 provide an audio interface between a user and the device 1000. Audio circuitry 1016 receives audio data from peripheral interface 1008, converts the audio data to an electrical signal, and transmits the electrical signal to the speaker 1020. The speaker 1020 converts the electrical signal to human-audible sound waves. Audio circuitry 1016 also receives electrical signals converted by microphone 1018 from sound waves. Audio circuitry 1016 converts the electrical signal to audio data and transmits the audio data to peripheral interface 1008 for processing. Audio data may be retrieved from and/or transmitted to memory 1002 and/or radio circuitry 1010 by peripheral interface 1008. In some embodiments the audio circuitry 1016 also includes an audio jack that provides an interface between audio circuitry 1016 and removable audio input/output peripherals, such as output only headphones or a headset with both output and input.

The input/output subsystem 1026 couples input/output peripherals on the device 1000, such as the touch-sensitive display system 1030 and the camera(s) 1034, to peripheral interface 1008. The input/output subsystem 1026 includes a display controller 1028, a camera controller 1032 and one or more other input controllers 1036 for one or more other input control devices 1038. The one or more other input controllers 1036 receive and/or send electrical signals from and/or to the one or more other input control devices 1038. The one or more other input control devices 1038 may include physical buttons such as push buttons and rocker switches (for example, to control operation of the microphone 1018 or the speaker 1020), dials, slider switches, click wheels, and the like. In some embodiments, the other input controllers 1036 may be coupled with one or more of a keyboard, an infrared port, a USB port, and a pointer devices such as a mouse.

The touch-sensitive display 1030 provides an input interface and an output interface between the device 1000 and the user. The display controller 1028 receives and sends electrical signals from and to the display 1030. The touch-sensitive display 1030 displays visual output to the user including graphics, texts, icons, video and any combination thereof. The touch-sensitive display 1030 has a touch-sensitive surface, sensor or set of sensors that accepts input from the user based on haptic and/or tactile contact. The touch-sensitive display 1030 and display controller 1028 (along with any associated modules and/or sets of instructions in memory 1002) detect contact (and any movement or breaking of contact) on the touch-sensitive display 1030 and converts the detected contact into interaction with objects displayed on the touch-sensitive display 1030 such as soft keys, icons, web pages and images. The touch-sensitive display 1030 may be responsive to the users finger, a stylus, or both.

The touch-sensitive display 1030 may use liquid crystal display (LCD) technology, light-emitting polymer (LYP) technology or light-emitting diode (LED) technology, although other display technologies may be used in various embodiments. The touch-sensitive display 1030 and the display controller 1028 may detect contact and any movement or breaking of contact using any of a variety of touch sensing technologies now known or later developed, including but not limited to capacitive, resistive, infrared and surface acoustic wave technologies, as well as other proximity sensor arrays or other elements for determining one or more points of contact with the touch-sensitive display 1030. In an example embodiment, projected mutual capacitance sensing technology is used. The touch-sensitive display 1030 may have a video resolution in excess of 100 dots per inch (dpi). In some embodiments, the display 1030 has a video resolution of approximately 160 dpi.

In some embodiments, in addition to the touch-sensitive display 1030, the device 1000 includes a touchpad for activating or deactivating particular functions. The touchpad is a touchpad is a touch-sensitive area of the device that, unlike the touch-sensitive display 1030, does not display visual output. The touchpad may be a touch-sensitive surface that is separate from the touch-sensitive display 1030 or an extension of the touch-sensitive surface formed by the touch-sensitive display 1030.

The device 1000 includes one or more cameras 1034 coupled with a camera controller 1032 that forms part of the input/output subsystem 1026. The camera(s) 1034 may include a charge-coupled device (CCD), complementary metal-oxide semiconductor (CMOS) phototransistors or photosensors, or similar technology. The camera(s) 1034 receive light from the environment, projected through one or more lenses, and converts the light to data representing an image. In conjunction with imaging software such as the graphics module, the camera(s) may capture still images and/or video sequences. In some embodiments, at least one optical sensor may be located on the back side of the device 1000, opposite the touch-sensitive display 1030 located on the front side of the device 1000. In some embodiments, the touch-sensitive display 1030 may be used as a viewfinder for still and/or video image acquisition. In some embodiments, at least one camera may be located on the front side of the device 1000 instead of, or in addition to, the at least one camera located on the back side of the device 1000.

The device 1000 includes one or more proximity sensors 1022 coupled with the peripheral interface 1008. The one or more proximity sensors 1022 turn off and disable the touch-sensitive display 1030 when the device 1000 is placed near a user's head, such as when the device 1000 is used to make a phone call.

The device 1000 includes one or more orientation sensors 1014 coupled with the peripheral interface 1008. The orientation sensor(s) may include one or more one or more linear accelerometers, one or more rotational accelerometers, one or more gyroscopes, one or more magnetometers, and/or one or more global navigation satellite system (GNSS) receivers, or similar technology. The GNSS receivers may be used to obtain information concerning the location and orientation of the device 1000. The one or more orientation sensors 1014 may include a combination of orientation and rotation sensors. By way of example, information may be displayed on the touch-sensitive display 1030 in a portrait view or a landscape view based on analysis of data received from the one or more orientation sensors 1014.

In some embodiments the device 1000 may also include one or more other sensors including, but not limited to, ambient light sensors and motion detectors. These sensors may be coupled with the peripheral interface 1008 or, alternatively, may be coupled with the other input controller(s) 1036 in the input/output subsystem 1026. In some embodiments, for example, the device 1000 includes at least one forward-facing (away from the user) light sensor and at least one rearward-facing (towards the user) light sensor that are used to collect ambient lighting metrics from the environment in which the device 1000 is operating for use in video and image capture, processing, and display applications.

Various computer software components are stored in the memory 1002 including an operating system 1044, a communication module 1046, a contact/motion module 1048, a graphics module 1050, a text module 1052, a positioning module 1054, and a plurality of applications 1056. In some embodiments the memory 1002 stores information relating to a device 1000 internal state. The device 1000 internal state includes one or more of active application state indicating which, applications, if any, are currently active; display state, indicating which applications, views or other information occupy various regions of the touch-sensitive display 1030; sensor state, including information obtained from the device's various sensors and input control devices; and location information concerning the location, orientation or both of the device 1000.

The operating system 1044 (e.g., OS X, ANDROID, WINDOWS or LINUX) includes various software components and/or drivers for controlling and managing general system tasks (for example, memory management, storage device control, power management) and facilitates communication between various hardware and software components. The communication module 1046 facilitates communication with other devices over the one or more external port(s) 1024 and also includes various software components for handling data received by the radio circuitry 1010 and/or external port(s) 1024. External port(s) 1024 (for example, universal serial bus (USB), FIREWIRE) is adapted for coupling directly to other devices or indirectly over a network (for example, the internet, a wireless LAN).

The contact/motion module 1048 detects contact with the touch-sensitive display 1030 (in conjunction with the display controller 1028) and other touch-sensitive devices such as touchpads. The contact/motion module 1048 includes various software components for performing various operations related to detection of contact, such as determining if contact has occurred (for example, detecting a finger touch), determining if there is movement of the contact and tracking the movement across the touch-sensitive display 1030 (for example, detecting a finger dragging event), and determining if the contact has ceased (for example, detecting when a finger has been lifted or broken contact). The contact/motion module 1048 receives contact data from the touch-sensitive surface of the display 1030. Determining movement of the point of contact, which is represented by a series of contact data, may include determining speed (magnitude), velocity (magnitude and direction), and/or acceleration (a change in magnitude and/or direction) of the point of contact. These operations may be applied to single contacts (for example, one finger contacts) or to multiple simultaneous contacts (for example, multiple finger contacts or "multi-touch" contacts). In some embodiments, the contact/motion module 1048 and display controller 1028 detect contact on a touchpad.

The contact/motion module 1048 may be configured to detect gesture input from a user. Different gestures on the touch-sensitive surface present different contact patterns. Thus, a gesture may be identified by detecting a particular contact pattern. For example, detecting a finger tap gesture includes detecting a finger-down event followed by detecting a finger-up (lift off) event at the same position (or substantially the same position) as the finger-down event (for example, at the position of an icon on the display 1030). As another example, detecting a finger swipe gesture on the touch-sensitive surface includes detecting a finger-down event followed by detecting one or more finger-dragging events, and subsequently followed by detecting a finger-up (lift off) event.

The graphics module 1050 includes various software components for rendering and displaying graphics on the touch-sensitive display 1030, including components for changing the intensity of graphics that are displayed. As used in this document, the term "graphics" includes any object that can be displayed to a user, including without limitation text, web pages, icons (such as user-interface objects including soft keys), digital images, videos, animations and the like. In some embodiments the graphics module 1050 stores data representing graphics to be used. Each graphic may be assigned a corresponding code. The graphics module 1050 receives, from applications, for example, one or more codes specifying graphics to be displayed along with, if necessary, coordinate data and other graphic property data, and then generates screen image data to communicate to the display controller 1028.

The text module 1052, which may be associated with or a component of the graphics module 1050, enables soft keyboards for entering text in various applications that use textual input. The positioning module 1054 determines the location of the device 1000 and provides this information for use in various applications. For example, the telephony application 1060 may use location information for location-based dialing, the camera application 1066 may use location information as metadata for still images or videos, and applications that provide location-based services such as mapping and navigation applications may use location information to determine the user's current location, travel speed, and so forth on a map. The positioning module 1054 may use global navigation satellite system (GNSS) receivers, cellular telephone signal triangulation, or similar technology to determine the location of the device 1000.

The applications 1056 include an image management application 1058, a telephony application 1060, a videoconferencing application 1062, a mapping application 1064, a camera application 1066, a messaging application 1068, a media player application 1070 which may include a video player and a music player, a search utility application 1072 and a farm management application 1074. Examples of other software applications that may be stored in the memory 1002 include, but are not limited to, word processing applications, drawing applications, presentation applications, communication/social media applications and voice recognition.

In conjunction with the touch-sensitive display 1030, display controller 1028, contact/motion module 1048, graphics module 1050, text module 1052 and the camera application 1066, image management application 1058 includes executable instructions to arrange, modify (for example, edit), or otherwise manipulate, label, delete, present (for example, in a digital slide show or album), and store still images, videos, or both.

In conjunction with the radio circuitry 1010, audio circuitry 1016, speaker 1020, microphone 1018, touch-sensitive display 1030, display controller 1028, contact/motion module 1048, graphics module 1050 and text module 1052, the telephony application 1060 may be used to enter a sequence of characters corresponding to a telephone number, access one or more telephone numbers in an address book, modify a telephone number that has been entered, dial a respective telephone number, conduct, a conversation and disconnect or hang up when the conversation is completed. As noted above, the wireless communication may use any of a variety of communications standards, protocols and technologies.

In conjunction with the radio circuitry 1010, audio circuitry 1016, speaker 1020, microphone 1018, touch-sensitive display 1030, display controller 1028, camera(s) 1034, contact/motion module 1048, graphics module 1050, text module 1052 and telephony application 1060, the videoconferencing application 1062 includes executable instructions to initiate, conduct and terminate a video conference between a user and one or more other participants in accordance with user instructions.

In conjunction with the positioning module 1054, touch-sensitive display 1030, display controller 1028, radio circuitry 1010, search utility application 1072 and graphics module 1050, the map utility application 1064 includes executable instructions to determine a present geographic location of the device 1000, retrieve map data from the memory 1002 or from a remote database using the radio circuitry 1010, and present the retrieved map data on the display 1030 with an indication of the present geographic location. The map utility application 1064 may include additional functionality and features such as route mapping, guidance and searching.

In conjunction with the touch-sensitive display 1030, display controller 1028, camera(s) 1034, camera controller 1032, contact/motion module 1048, graphics module 1050 and image management application 1058, the camera application 1066 includes executable instructions to capture still images, video or both and storing them in memory 1002, modify characteristics of the still image or video, and delete still images or videos from memory 1002.

In conjunction with the touch-sensitive display 1030, display controller 1028, text module 1052, radio circuitry 1010 and communication module 1046, the messaging application 1068 includes executable instructions that enable the user to send and receive text, still images, video and other content via any of a variety of messaging services and protocols. The messaging application 1068 may enable cellular network-based messaging services such as the short messaging service (SMS) and multimedia messaging service (MMS), may enable over-the-top (OTT) messaging services such as iMessage®, Whatsapp®, WeChat® and Facebook® Messenger®, or may enable a combination of the two types of services.

In conjunction with the touch-sensitive display 1030, display controller 1028, contact/motion module 1048, graphics module 1050, audio circuitry 1016, speaker 1020, radio circuitry 1010 and search utility application 1072, media player application 1070 includes executable instructions that allow the user to download and play recorded music and other sound files stored in one or more file formats, such as MP3 or AAC files, and executable instructions to display, present or otherwise play videos (for example, on the touch-sensitive display 1030 or on an external, connected display via external port(s) 1024).

In conjunction with the radio circuitry 1010, touch-sensitive display 1030, display controller 1028, text module 1052 and contact/motion module 1048, the search utility application 1072 includes executable instructions for searching contents of the device 1002, an external computer network such as the internet, or both for text, music, sound, images, videos or other files. The search utility application 1072 may execute searches under the direction of a user, another application or module of the device 1002, or both and links to, retrieves and/or displays web pages, data files or other content.

In conjunction with the radio circuitry 1010, touch-sensitive display 1030, display controller 1028, text module 1052, the farm management application 1074 includes executable instructions for enabling the user to receive farm management information from one or more external sources, view and manipulate the farm management data, and communicate new or updated farm management data to one or more external sources. The farm management data may include projects or tasks to be completed and the progress of the projects or tasks.

Each of the modules and applications discussed above corresponds to a set of executable instructions for performing one or more functions as described above and elsewhere in this document. These modules and applications need not be implemented as separate computer programs, procedures or modules, and thus various subsets of these modules may be combined or otherwise rearranged in various embodiments. In some embodiments, the memory 1002 may store a subset of the modules and applications identified above. Furthermore, the memory 1002 may store additional modules and data structures not described herein.

In some embodiments, device 1000 is a device where operation of a predefined set of functions on the device is performed exclusively through a touch-sensitive display and/or a touchpad. By using a touch-sensitive display and/or a touchpad as the primary input control device for operation of the device 1000, the number of physical input control devices (such as push buttons and dials) on the device 1000 may be reduced.

The processor(s) 1006 includes one or more integrated circuits programmed or configured to implement the functions described herein; by way of example the processor(s) 1006 may be a digital controller and may include one or more general purpose microprocessors or microcontrollers, programmable logic devices, or application specific integrated circuits. The processor(s) 1006 may include multiple computing components. The processor(s) 1006 may also include one or more discrete and/or analog circuit components operating in conjunction with the one or more integrated circuits or computing components.

The device 1000 is one embodiment of a multifunction computing device. It will be appreciate that other, equally preferred computing devices may be used in lieu of or in addition to the device 1000. The device 1000, for example, may have more or fewer components than shown and discussed herein, may combine two or more components and may have a different configuration or arrangement of the components. The various components illustrated in FIG. 11 may be implemented in hardware, software, or a combination of hardware and software, including one or more signal processing and/or application specific integrated circuits. In some embodiments some or all of the hardware components illustrated in FIG. 11 are implemented in separate devices (for example, integrated circuits), while in other embodiments most or all of the hardware components illustrated are implemented in a single integrated circuit. Furthermore, the memory 1002 may take any of various forms, including volatile or non-volatile memory; dynamic RAM or static RAM; and may include virtual memory.

Although the invention has been described with reference to one or more embodiments illustrated in the attached drawing figures, it is noted that equivalents may be employed and substitutions made herein without departing from the spirit or scope of the invention. Furthermore, the following claims describe one or more exemplary embodiments of the invention and are not intended to describe all embodiments of the invention or all novel aspects of the invention.

The invention claimed is:

1. A computing system comprising:
one or more computing devices implementing a host system for maintaining a plurality of user accounts, each of the user accounts including offboard electronic device information and agricultural machine information specific to a user,
the offboard electronic device information including device access rights, offboard application access rights and offboard application data for at least one offboard electronic device,
the agricultural machine information including agricultural machine access rights, user onboard application access rights, machine onboard application access rights and machine onboard application data for at least one agricultural machine,
the host system configured to:
receive a request for user access, the request for user access including user identification information and source identification information,
use the user identification information to identify a user account from the plurality of user accounts corresponding to the request for user access,
use the source identification information to determine whether the source of the request for user access is an offboard electronic device or an onboard computing system of an agricultural machine,
use the source identification information and information from the user account corresponding to the request for user access to determine whether the user has access rights to the offboard electronic device or the agricultural machine,
if the source of the request for user access is an offboard electronic device and the user has access rights to the offboard electronic device:
identify offboard applications that are authorized for the offboard electronic device according to the user account,
communicate authorized offboard application information to the offboard electronic device, the authorized offboard application information for enabling operation of authorized offboard applications on the offboard electronic device, and
synchronize offboard application data between the offboard electronic device and the host system,
if the source of the request for user access is an onboard computing system and the user has access rights to the agricultural machine:
identify onboard applications that are authorized for the user and that are authorized for the agricultural machine according to the user account,
communicate authorized onboard application information to the onboard computing system, the authorized onboard application information for enabling onboard applications, the onboard applications running on the onboard computing system and enabling functionality of mechanical systems of the agricultural machine, and
synchronize onboard application data between the onboard computing system of the agricultural machine and the host system,
wherein the offboard electronic device is a device that is not integrated into the agricultural machine, the offboard application is an application that runs on the offboard electronic device, the onboard computing system is a computing system that is integrated into the agricultural machine, and the onboard application is an application that runs on the onboard computing system.

2. The computing system as set forth in claim 1, the host system further configured to receive setting information from the user and store the setting information in the user profile, the setting information applying to both offboard electronic devices and onboard computing systems.

3. The computing system as set forth in claim 2, the setting information including human-machine interface presentation preferences that are applied to both offboard electronic device human-machine interfaces and agricultural machine human-machine interfaces.

4. The computing system as set forth in claim 1, the agricultural machine information including at least one of tractor information, combine harvester information and applicator information.

5. The computing system as set forth in claim 1, the agricultural machine information including primary machine information and secondary machine information, wherein the secondary machine information relates to an implement attached to the primary machine.

6. The computing system as set forth in claim 1,
the offboard application access rights and the onboard application access rights including access rights to third-party applications that require interaction with a third-party host site,
communicating authorized application information to the offboard electronic device includes enabling the portable electronic device to access the third-party host site, and
communicating authorized onboard application information to the onboard computing system includes enabling the computing system to access the third-party host site.

7. The computing system as set forth in claim 1, wherein if the source of the request for user access is an onboard electronic device and the user has access rights to the onboard electronic device, the host system configured to:

identify onboard applications that are not authorized for the onboard electronic device according to the user account but that are available for purchase, and communicate information to the onboard electronic device indicating onboard applications available for purchase.

8. The computing system as set forth in claim 1, wherein if the source of the request for user access is an offboard electronic device and the user has access rights to the offboard electronic device, the host system configured to:

identify offboard applications that are not authorized for the offboard electronic device according to the user account but that are available for purchase, and communicate information to the offboard electronic device indicating offboard applications available for purchase.

9. The computing system as set forth in claim 1, wherein if the source of the request for user access is an offboard electronic device and the user has access rights to the offboard electronic device, the host system configured to:

receive from the offboard electronic device a request to authorize an onboard application, and in response to the request, update the user account to authorize the onboard application.

10. The computing system as set forth in claim 1, wherein if the source of the request for user access is an offboard electronic device and the user has access rights to the offboard electronic device, the host system configured to:

receive from the offboard electronic device a request to authorize an offboard application, and in response to the request, update the user account to authorize the offboard application.

11. The computing system as set forth in claim 1, wherein if the source of the request for user access is an onboard electronic device and the user has access rights to the onboard electronic device, the host system configured to:

receive from the onboard electronic device a request to authorize an offboard application, and in response to the request, update the user account to authorize the offboard application.

12. The computing system as set forth in claim 1, wherein if the source of the request for user access is an offboard electronic device and the user has access rights to the offboard electronic device, the host system configured to:

receive from the offboard electronic device a request to authorize an onboard application, and in response to the request, update the user account to authorize the onboard application.

13. The computing system as set forth in claim 1, wherein if the source of the request for user access is an onboard electronic device and the user has access rights to the onboard electronic device, the host system configured to:

receive from the onboard electronic device a request to authorize an onboard application, and in response to the request, update the user account to authorize the onboard application.

14. The computing system as set forth in claim 1, wherein if the source of the request for user access is an onboard computing system and the user has access rights to the agricultural machine:

identify onboard applications that are authorized for the agricultural machine but not for the user according to the user account but that are available for purchase, and communicate information to the onboard computing system indicating applications available for purchase.

15. The computing system as set forth in claim 1, the onboard applications including automated guidance and machine-to-machine communications.

16. The computing system as set forth in claim 1, the offboard applications including field planning, route planning, reports and invoicing.

17. The computing system as set forth in claim 1, at least one of the onboard apps and offboard apps being the same app, wherein functionality of the app on an offboard device is different than the functionality of the app on an onboard computing system, and wherein app data generated on the offboard electronic device is used by the app when running on the onboard computing system, and wherein data generated on the onboard computing system is used by the app when running on the offboard electronic device.

* * * * *